Nov. 8, 1927.
J. A. VOLK, JR
1,648,704
ELECTRICAL FIXTURE
Filed Aug. 1, 1922    2 Sheets-Sheet 1
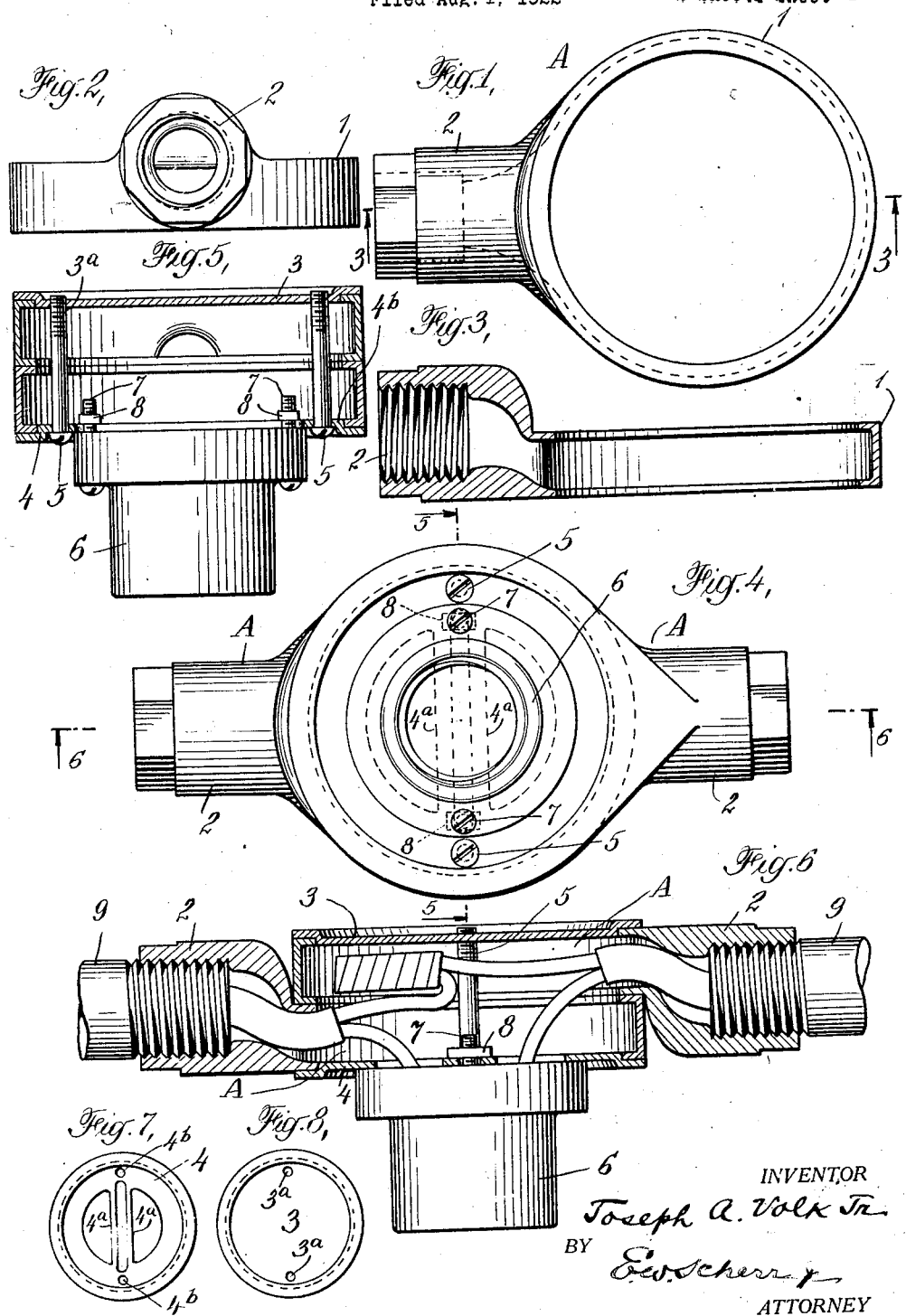
INVENTOR
Joseph A. Volk Jr.
BY
E. W. Scherr
ATTORNEY

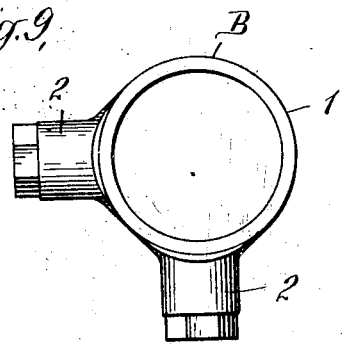
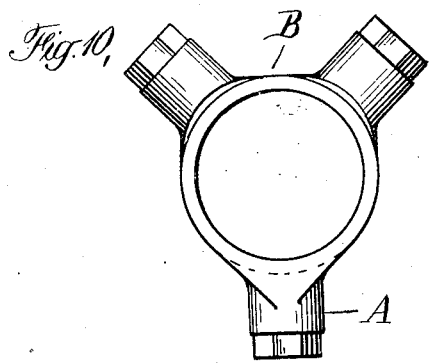
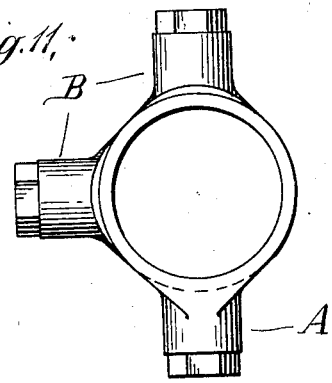
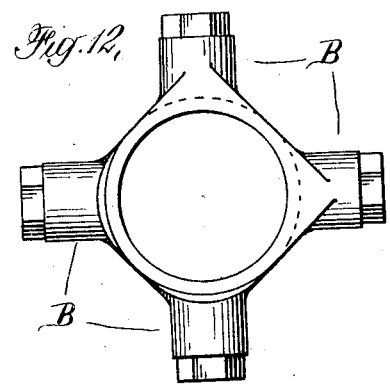
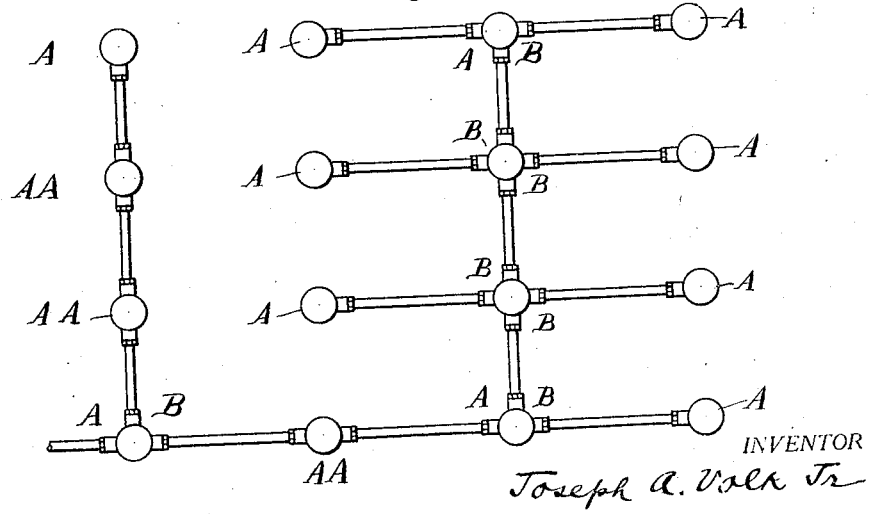

Patented Nov. 8, 1927.

1,648,704

UNITED STATES PATENT OFFICE.

JOSEPH A. VOLK, JR., OF NORWALK, CONNECTICUT, ASSIGNOR TO THE VECO MFG. COMPANY, A CORPORATION OF CONNECTICUT.

ELECTRICAL FIXTURE.

Application filed August 1, 1922. Serial No. 578,975.

My present invention relates to an electrical fixture adapted to be used as an outlet box or a junction box, and by my improvements I provide one or more unit boxes which are usable either by themselves or are conveniently adapted to be combined by the electrician at the job to form boxes having a larger number of nipples than are comprised in the individual units, or having nipples disposed at different angles, etc., to suit the requirements of the particular electrical installation.

The drawings show my improvements embodied in the forms I prefer. In them, Fig. 1 is a face view of one of the single nipple elements for use alone or for building up multiple nipple outlet boxes in accordance with my invention; Fig. 2 is an end view of said element as viewed from the left in Fig. 1; Fig. 3 is a sectional view of the same element on the line 3—3 in Fig. 1; Fig. 4 is a plan view of two of the elements combined to build up a two nipple outlet box, said view further showing a cap in place on the box supporting an incandescent lamp socket; Fig. 5 is a cross-section partly in elevation on the line 5—5 in Fig. 4; Fig. 6 is a similar view, but the section is taken on the line 6—6 in Fig. 4; Figs. 7 and 8 are plan views of two forms of caps or closures for said elements but on a reduced scale compared with the preceding figures; Fig. 9 is a face view of another kind of element for use alone or for building up three or four nipple outlet boxes within my invention; Fig. 10 is a face view of a three nipple box consisting of the combined units of Figs. 1 and 9; Fig. 11 is a face view of another form of three nipple box built up of the same elements of said Figs. 1 and 9; Fig. 12 is a face view of a four nipple box built up of two elements like Fig. 9; and Fig. 13 is a diagrammatic plan view to indicate how my units may be used in a lighting installation in various ways including various combinations of said units as may be required by the specific given installation.

Describing now my invention by way of the illustrative embodiments shown in the drawings, A is a single nipple unit and B is a double nipple unit which are usable singly; or each is adapted to be combined with another unit of the same kind; or the two units A and B are adapted to be combined with each other.

The unit A is shown in Figs. 1 and 3 and comprises a circular enclosing wall 1 having a nipple 2 projecting outwardly from said wall, said nipple being in communication with the interior of said member.

The nipple is internally screw-threaded whereby it is adapted to be connected with the usual conduit pipe containing the electric wires.

The nipple is substantially twice as thick as the walled member and is attached by only one of its cross-sectional halves to the wall of said member.

There may be a large circular opening in the top and bottom face of the walled members adapted to be closed wholly or only partially by cover means in the form of plate or disk members 3 and 4. These preferably are dished to provide a bottom portion receivable into the openings and a surrounding flanged portion adapted to rest on the rim of the openings, as shown in Figs. 5 and 6, etc.

These plates may take a variety of forms, including those shown. Thus, plate 3, as shown on a reduced scale in Fig. 8, is a complete closure except for the two screw-holes $3^a$ through it. The plate 4 differs in that it has an opening through it bridged by two parallel cross-pieces $4^a$—$4^a$. This plate 4 also has two plain holes through it.

5—5 are screws adapted to be passed through the holes $4^b$ in plate 4 and then screwed into the threaded holes $3^a$ in the plate 3 as best shown in Fig. 5 (or Fig. 6). Said screws not only secure the plates 3 and 4 in place but they also through said dished covers hold the two units together.

The aforesaid parallel cross-pieces $4^a$—$4^a$ are means for fastening an electrical fixture such as an incandescent lamp socket 6 to the plate 4, which will be on the exposed or outer side of the box when it is on the ceiling or other surface of the installation. Thus they enable screws 7 to be passed through the holes in the base of the lamp socket or the like and then through the space between the cross-pieces $4^a$—$4^a$, on the other side of which they screw into units 8 which straddle the cross-pieces as shown in Figs. 4 and 6. Obviously, different diameters of fixtures can be fastened to the cross-pieces $4^a$, that being one of their advantages.

The single nipple unit A (Figs. 1 to 3), equipped as above described, may be used by itself as shown at A in Fig. 13; or two of said units A may be superposed in reversed positions as best shown in Fig. 6 and fastened together by any suitable means such as the above described screw and cover plate means 3, 4 and 5. Fig. 6 shows the interior of the box made by the combined units and shows a series wiring for a lamp socket and the conduit-pipes 9 connected with the box. Fig. 4 is a plan view of the underneath or exposed face of the devices in Fig. 6, assuming they have been mounted in place in a given installation.

These Figs. 4 and 6 show the nipples 2—2 diametrically opposite but they may be disposed at various angles to each other to suit the requirements of the installation.

The installation diagram Fig. 13 shows at AA boxes like Fig. 6 made up of two single nipple units A.

The only other unit I find it necessary to use besides unit A (Fig. 1) is a two nipple unit B (Fig. 9); this is in all respects the same as unit A except that it has two nipples 2 at right angles to each other. This unit B is adapted to be combined with a unit A to make up, for example, a three nipple box like Fig. 10 or Fig. 11; or two units B can be combined to make up a four nipple box like Fig. 12.

The above described cover and fastening means and electrical fixture mounting means will be used with these combinations of units A and B and of units B with each other exactly as previously described in connection with the single unit box A and AA.

The installation diagram Fig. 13 shows at AB boxes like Fig. 11 made, as described, of the two units A and B; and shows at BB boxes like Fig. 12 made up of two B units.

The units A and B may have permanent or integral bottoms. They will be combinable as described just the same, except that the electrician may have to bore holes through one of the bottoms to attach, etc., the lamp socket or other fixture. This they sometimes prefer to do and can readily do, if the units are made of a soft metal like aluminum.

Some of the foregoing improvements may be used without others. Also, changes and modifications may be made in the practical embodiments of my present improvements which will, nevertheless, still be within the spirit of the foregoing description and within the meaning and spirit of the annexed claims and which as such are accordingly intended to be covered thereby.

What I claim is:

1. An outlet box and the like comprising a walled member having a nipple adapted to be connected with a conduit pipe, said nipple projecting outwardly in off-set relationship from the wall of said member in communication with the interior thereof, two of said boxes being superposable in reversed position to build up a multi-nipple box, the top and bottom faces of each of said walled members having openings therethrough; covers for said openings; and means extending between and uniting opposite covers whereby said covers clamp and secure together the superposed nipple boxes.

2. An outlet box and the like comprising a walled member having a nipple adapted to be connected with a conduit pipe, said nipple projecting outwardly from the wall of said member in communication with the interior thereof, said nipple being substantially twice as thick as the walled member with one side of said nipple being substantially flush with one face of said member, two of said nipple boxes being superposable in reversed positions to build up a multiple nipple box, the top and bottom faces of said walled member having openings therein; dished covers for said openings, the bottom portions thereof being received into the aforesaid openings with the flanges of said covers resting on the rims of said openings; and cover securing means comprising headed members connecting the bottom portion of one cover to the bottom portion of the opposite cover, the headed portions of said members being contained in the dished space of the covers.

Signed at New York in the county of New York and State of New York this 31st day of July A. D. 1922.

JOSEPH A. VOLK, Jr.